United States Patent [19]

Sakamoto

[11] Patent Number: 5,263,366
[45] Date of Patent: Nov. 23, 1993

[54] SPEED SENSING HUB UNIT
[75] Inventor: Junshi Sakamoto, Fujisawa, Japan
[73] Assignee: Nippon Seiko Kabushiki Kaisha, Tokyo, Japan
[21] Appl. No.: 865,213
[22] Filed: Apr. 8, 1992
[30] Foreign Application Priority Data
  Apr. 12, 1991 [JP] Japan .................. 3-32686[U]
[51] Int. Cl.⁵ .......................................... G01M 19/00
[52] U.S. Cl. ................................... 73/118.1; 384/448
[58] Field of Search ............... 73/118.1, 130; 384/448; 303/93

[56] References Cited
U.S. PATENT DOCUMENTS
5,097,702 3/1992 Nantua et al. .................... 73/118.1

FOREIGN PATENT DOCUMENTS
62-170363 10/1987 Japan .
63-166601 7/1988 Japan .
63-189775 12/1988 Japan .
1-254401 10/1989 Japan .

Primary Examiner—Jerry W. Myracle
Attorney, Agent, or Firm—Helfgott & Karas

[57] ABSTRACT

A speed sensing hub unit comprising an axial shaft extending from a constant velocity joint having a male spline, a cylindrical hub having a first flange on an outer peripheral face thereof for supporting a wheel and a female spline on an inner peripheral face thereof which engages with the male spline, an inner ring fitted onto the axial shaft and having a second inner ring raceway, a first nut which threads onto the axial shaft to clampingly hold the inner ring between itself and the constant velocity joint, which has at least an inner end face formed with a plurality of axial holes or slots-and-ridges, a sensor rotor surrounding the first nut, an outer ring formed with a pair of outer ring raceways corresponding to the first and second inner ring raceways, and a second flange for attachment to a suspension unit, a speed sensor facing to the the sensor rotor; and a plurality of rolling bodies between the first and second inner ring raceways and the pair of outer ring raceways.

6 Claims, 3 Drawing Sheets

SPEED SENSING HUB UNIT

DETAILED DESCRIPTION OF THE INVENTION

1. Industrial Field of the Invention

This invention relates to a speed sensing hub unit for detachably and rotatingly supporting a vehicle drive wheel (either front wheel for front wheel drive vehicles, rear wheel for rear wheel drive vehicles, front and rear wheels for four wheel drive vehicles).

2. Description of the Prior Art

FIG. 3 shows a conventional speed sensing hub unit for detachably and rotatingly supporting a vehicle wheel such as that disclosed in Japanese Patent First Publications No. 63-246677 (1988) and No. 64-28056 (1989).

In FIG. 3, a constant velocity unit 2 has a shaft 1 axially extending therefrom, in which the axially inner first large diameter portion 3 and the axially outer first small diameter portion 4 are connected together by a first shoulder portion 5. A male threaded portion 6 is formed on an axially outer end of an outer peripheral surface of the first small diameter portion 4, and a male spline 7 is formed on the remaining outer peripheral surface of the first small diameter portion 4.

The term "axially inner" means a direction towards the center of the vehicle and to the right in the drawings, while the term "axially outer" means a direction to the left in the drawings in the present specification and claims.

A generally cylindrical hub 8 having a first flange 11 on an outer peripheral surface thereof for supporting a vehicle wheel 9 and a disc rotor 10 for a brake, has a female spline 12 on an inner peripheral face thereof which engages with the male spline 7.

The hub 8 has a second large diameter portion 13 centrally located in the hub 8, and a second small diameter portion 15 located closer to an axially inner end of the hub 8. There is a second shoulder 18 between the second large diameter portion 13 and the second small diameter portion 15.

A first inner ring raceway 14 is formed directly on the second large diameter portion 13 on its outer peripheral surface.

An inner ring 16 is fitted onto an outer peripheral surface of the second small diameter portion 15. A second inner ring raceway 17 is formed on an outer peripheral surface of the inner ring 16.

The axially inner end edge of the inner ring 16 protrudes out from the inner end of the hub 8, and abuts with the first shoulder 5. As a result, the inner ring 16 is clampingly held between the first shoulder 5 and the second shoulder 18 formed between the second large diameter portion 13 and the second small diameter portion 15.

Furthermore, a nut 19 is threaded onto the male threaded portion 6 which is formed on the outer peripheral surface of the axially outer end of the shaft 1 of the constant velocity joint 2 and protrudes out from the axially outer end of the hub 8 in the assembled condition. As a result, the inner ring 16 and the hub 8 are clampingly held with a washer 20 between the axially inner face of the nut 19 and the first shoulder 5.

A cylindrically shaped outer ring 21 is provided around the hub 8. The outer ring 21 is formed with a pair of outer ring raceways 22, 22 on an inner peripheral surface thereof which correspond to first and second inner ring raceways 14, 17. A plurality of rolling bodies 23, 23 are provided between the first and said second inner ring raceways 14, 17 and the pair of outer ring raceways 22, 22.

A second flange 24 is formed on an outer peripheral surface of the outer ring 21 for holding the outer ring 21 in a suspension unit. A speed sensor rotor 25 is fixedly attached to a portion of the shaft 1 of the constant velocity joint 2, and a speed sensor 27 is supported on an arm 26 of the suspension unit so as to face the outer peripheral surface of the sensor rotor 25.

The speed sensing hub unit constructed as above, allows the hub 8 to rotate inside the outer ring 21 due to the rotation of the plurality of rolling bodies 23, 23 provided between the first and second inner ring raceways 14, 17 and the corresponding outer ring raceways 22, 22. Also, the speed of rotation of the hub can be detected by the speed sensor 27.

With the conventional speed sensing hub unit constructed as above, not only is the hub 8 fixedly held with respect to the shaft 1 by the single nut 19, but also the inner ring 16 is held with respect to the hub 8 by the single nut 19. As a result, if the nut 19 becomes loose, the inner ring 16 becomes loose and sloppy with respect to the hub 8 so that the hub 8 no longer rotates smoothly.

The nut 19 can be stopped from loosening simply by increasing the tightening torque thereon. However if the tightening torque is too large, the bearing preload becomes excessive so that the life of the antifriction bearing which supports the hub 8 inside the outer ring 21 is shortened.

To avoid this problem, the tightening torque of the nut 19 is carefully supervised during assembly of the wheel support parts, to ensure that the nut 19 will not slacken, and that correct bearing preload adjustment is achieved. However, this careful supervision causes unavoidable inconvenience with the assembly operation of the wheel support parts in the vehicle production line.

In order to address these problems, the present inventor has proposed the speed sensing hub unit (Japanese Utility Model Pending Application No. 2-401769 (1990). This previous proposal is constructed as shown in FIG. 4.

A second male threaded portion 29 is formed on a portion of the outer peripheral surface of the inner end of the hub 8 which extends inwards from the inner ring 16, and a first nut 30 is threaded onto this second male threaded portion 29. A second shoulder 18 is formed as a continuation between the first large diameter portion 13 and the second small diameter portion 15. As a result the inner ring 16 is clampingly held between the second shoulder 18 and the first nut 30. In this way, with the inner ring 16 fixed by tightening the first nut 30 on the second threaded portion 29, the axially inner end face of the first nut 30 extends out from the axially inner end face of the hub 8.

A first male threaded portion 28 formed on the outer peripheral surface of the axially outer end of the shaft 1 of the constant velocity joint 2 protrudes out from the axially outer end of the hub 8 when the parts are in an assembled condition. A second nut 31 is threaded onto this first male threaded portion 28. As a result, the first nut 30, the inner ring 16 and the hub 8 with a washer 20 are clampingly held between the axially inner face of the second nut 31 and the first shoulder 5.

An annular metallic sensor rotor 25 is fixedly fitted to an outer peripheral surface of the inner ring 16. A rotation speed sensor 27 is supported on a dust cover 32 which is fixedly attached onto the axially inner end portion of the outer ring 21. The rotation speed sensor 27 is positioned so as to face the axially inner face of the sensor rotor 25.

In the case of the previously proposed rotation speed sensing hub unit, the inner ring 16 is prevented from coming off the hub 8, and the bearing preload is adjusted by the tightening of the first nut 30 on the second male threaded portion 29. As a result, the tightening of the nut 30 on the second male threaded portion 29 can be done on an automated line at a bearing assembly station, and the very precise torque adjustment necessary to apply the appropriate bearing preload to the bearings can be easily carried out.

Furthermore the first nut 30 is prevented from becoming loose by tightening the threaded engagement of the second nut 31 on the first male threaded portion 28 of the shaft 1. Since the tightening torque of the second nut 31 does not influence the bearing preload, the tightening torque of the second nut 31 can be sufficiently large so that the second nut 31 and first nut 30 are not likely to slacken, and the bearing preload can be appropriately maintained even when the inner ring 16 is positively prevented from coming away from the hub 8. Consequently on a vehicle production line, the second nut 31 can be tightened to a large torque (with no particular control limits) so that the tightening operation can be easily carried out.

However, in the case of the previously proposed rotation speed sensing hub unit, since the annular metallic sensor rotor 25 is fitted onto the inner ring 16, and the speed sensor 27 axially faces the sensor rotor 25, the axial length of the speed sensing hub unit (horizontal direction in FIG. 4) is required to be large.

That is to say, in order to ensure that the sensor rotor 25 does not incline with respect to the inner ring 16 when the sensor rotor 25 is fitted on the inner ring 16 for supporting, the thickness of the sensor rotor 25 must be at least 5 mm. The length of the inner ring 16 and the hub 8 on which the inner ring 16 fits is thus increased by this amount. Consequently the length of the speed sensing hub unit is increased, giving an undesirable increase in weight and reduction in strength.

With the speed sensing hub unit of the present invention, the above situation has been carefully considered.

SUMMARY OF THE INVENTION

The speed sensing hub unit of the present invention in a first feature comprises a shaft axially extending from a constant velocity joint and having an axially inner first large diameter portion and an axially outer first small diameter portion connected together by a first shoulder portion with a first male threaded portion formed on an axially outer end of an outer peripheral surface of the first small diameter portion and with a male spline formed on the remaining outer peripheral surface of the first small diameter portion; a cylindrical hub having a first flange on an outer peripheral surface thereof for supporting a wheel, a female spline on an inner peripheral surface thereof which engages with the male spline of the first small diameter portion, a second large diameter portion centrally located on an outer peripheral surface of the hub with a first inner ring raceway formed directly thereon, a second small diameter portion extending to an axially inner end of the hub and a second male threaded portion formed on the outer peripheral surface of the axially inner end of the hub; an inner ring fitted onto the outer peripheral surface of the second small diameter portion and having a second inner ring raceway formed on an outer peripheral surface of the inner ring; a first nut which threads onto the second male threaded portion to clamplingly hold the inner ring between itself and the second shoulder between the second large diameter portion and second small diameter portion, which is formed with a plurality of axial holes or slots-and-ridges on the axially inner face thereof and which protrudes out from the inner end of the hub; a sensor rotor of a generally annular metal plate having an L-shaped cross section to surround the circumference of the first nut, and being clamplingly held between the axially outer face of the first nut and the axially inner end face of said inner ring; an outer ring formed with a pair of outer ring raceways on an inner peripheral surface thereof which correspond to the first and second inner ring raceways and a second flange formed on an outer peripheral surface thereof for attachment to a suspension unit; a speed sensor supported on the outer ring so as to face towards the outer peripheral surface of the sensor rotor, and a plurality of rolling bodies provided between the first and second inner ring raceways and the pair of outer ring raceways.

Furthermore, with the speed sensing hub unit in a second feature, the sensor rotor is omitted and instead an outer peripheral surface of the first nut is cylindrically formed and provided with evenly spaced slots-and-ridges formed therein, and the speed sensor is supported on the outer ring so as to face towards the outer peripheral surface of the first nut.

DESCRIPTION OF THE PREFERRED EMBODIMENTS

Figure 1:
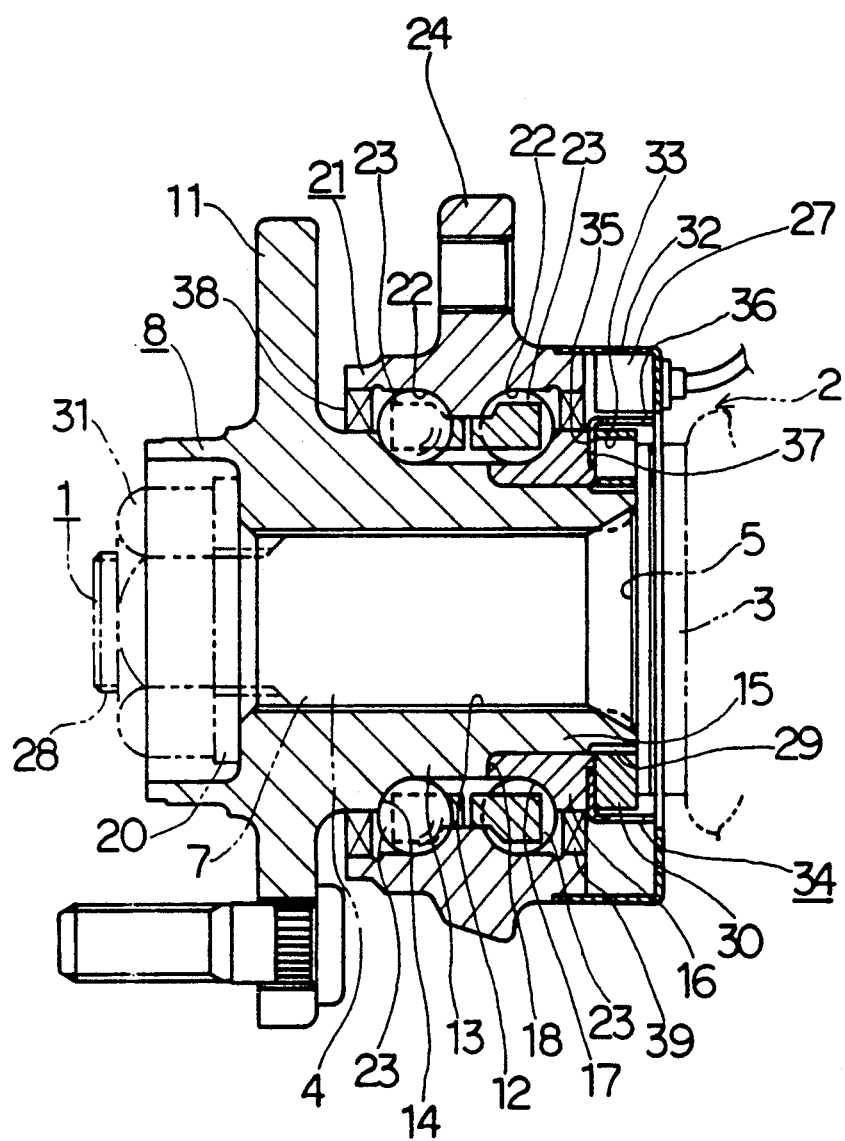
FIG. 1 is a cross sectional view of a first embodiment of the present invention.

FIG. 1 shows a first embodiment of the present invention. A constant velocity joint 2 (illustrated by phantom lines) has a shaft 1 axially extending therefrom. The first large diameter portion 3 is formed on the axially inner side of the shaft 1 of the constant velocity joint 2, and the first small diameter portion 4 is formed on the axially outer side of the shaft 1, and the portions 3 and 4 are connected together by a first shoulder 5. A first male threaded portion 28 (illustrated by phantom lines) is formed on the axially outer end of the outer peripheral surface of the first small diameter portion 4, and a male spline 7 is formed on the remaining portion of the outer peripheral surface of the small diameter portion 4. A generally cylindrical hub 8 has a flange 11 for supporting a wheel on an outer peripheral face thereof. The hub 8 has a female spline 12 formed on an inner peripheral surface thereof for engagement with the male spline 7.

A first inner ring raceway 14 is formed directly on a second large diameter portion 13 centrally located on an outer peripheral surface of the hub 8 which is fitted onto a second small diameter portion 15 on the outer peripheral surface of the hub 8 closer to an axially inner end thereof and a second inner ring raceway 17 is formed on the outer peripheral surface of the inner ring 16. A second male threaded portion 29 is formed on a portion of the outer peripheral surface of the axially inner end of the hub 8 which extends out from the inner ring 16. A first nut 30 is threaded onto this second male threaded portion 29.

The outer peripheral surface of the first nut 30 is cylindrical in shape, and is drilled with a plurality of axial through holes 33 at evenly spaced intervals in a peripheral direction. The axial through-holes 33 are open in the axially inner face of the first nut 30.

A sensor rotor 34 is clampingly held between an axially outer end face of the first nut 30, and the axially inner end face of the inner ring 16.

The sensor rotor 34 is made of a thin metal plate which is press-formed into a generally cylindrical shape with an L-shaped cross section and has an annular portion 35 which is clamped between the first nut 30 and the inner ring 16 and a cylindrical portion 36 which covers the circumference of the first nut 30. A step portion 37 is formed on an axially inner end face of the inner ring 16 and engages the annular portion 35 of the sensor rotor 34.

A second shoulder 18 is formed as a continuation between the first large diameter portion 13 and the second small diameter portion 15. As a result, the inner ring 16 is clampingly held between the second shoulder 18 and the first nut 30. In this way, with the inner ring 16 fixed by tightening the first nut 30 on the second threaded portion 29, the axially inner end face of the first nut 30 extends out from the axially inner end face of the hub 8.

A first male threaded portion 28 formed on the axially outer end of the outer peripheral face of the shaft 1 of the constant velocity joint 2 protrudes out from the axially outer edge of the hub 8 when the parts are in an assembled condition. A second nut 31 (illustrated by phantom lines) is threaded for tightening onto this first male threaded portion 28. As a result, the first nut 30, the inner ring 16 and the hub 8 are clampingly held with a washer 20 between the axially inner face of the second nut 31 and the first shoulder 5 of the shaft 1.

A cylindrical outer ring 21 is provided around the circumference of the hub 8. A pair of outer ring raceways 22, 22 are formed on an inner peripheral surface of the outer ring 21 so as to oppose first and second inner ring raceways 14 and 17.

A plurality of rolling bodies 23, 23 are provided between the first and second inner raceways 14, 17 and the pair of outer raceways 22, 22.

A second flange 24 is formed on an outer peripheral surface of the outer ring 21 for attaching the outer ring 21 to a suspension unit for supporting.

Seals 38 and 39 are provided on inner peripheral surfaces on both axial side portions of the outer ring 21 in order to prevent the ingress of foreign matter into the portion where the rolling bodies 23, 23 are provided.

A rotation speed sensor 27 is supported on a dust cover 32 which is fixedly attached onto the axially inner end portion of the outer ring 21. An end portion of the rotation speed sensor 27 is positioned so as to face the outer peripheral surface of the cylindrical portion 36 of the sensor rotor 34.

The speed sensing hub unit of the present invention constructed as above, as with the conventional speed sensing hub unit, allows the hub 8 to rotate inside the outer ring 21 due to the rotation of the plurality of rolling bodies 23, 23 provided between the first and second inner ring raceways 14, 17 and the corresponding pair of outer ring raceways 22, 22.

Also, as with the conventional rotation speed sensing hub unit, the inner ring 16 is prevented from coming off the hub 8, and the bearing preload is adjusted, by the tightening of the first nut 30 on the second threaded portion 29. As a result the tightening of the first nut 30 on the second threaded portion 29 can be done on an automated line at a bearing assembly station, and the very precise torque adjustment necessary to apply the appropriate bearing preload to the bearings can be easily carried out.

In addition, in the case of the speed sensing hub unit of the present invention, the tightening of the first nut 30 can be carried out by engaging a tool with the plurality of through-holes 33 open on the axially inner face of the nut 30. Hence, even when the outer peripheral face of the first nut 30 has a cylindrical peripheral surface covered by the sensor rotor 34, the tightening of the first nut 30 can be reliably and securely carried out.

Furthermore the first nut 30 is prevented from coming loose by the tightly threaded engagement of the second nut 31 on the first male threaded portion 28. Since the tightening torque of the second nut 31 does not influence the bearing preload, the tightening torque of the second nut 31 can be sufficiently large so that the second nut 31 and the first nut 30 are not likely to slacken, while the bearing preload can be appropriately maintained, resulting in that the inner ring 16 is positively prevented from coming away from the hub 8.

Consequently on a vehicle production line, the second nut 31 can be tightened to a large torque (with no particular control limits) so that the tightening operation can be easily carried out.

Figure 2:
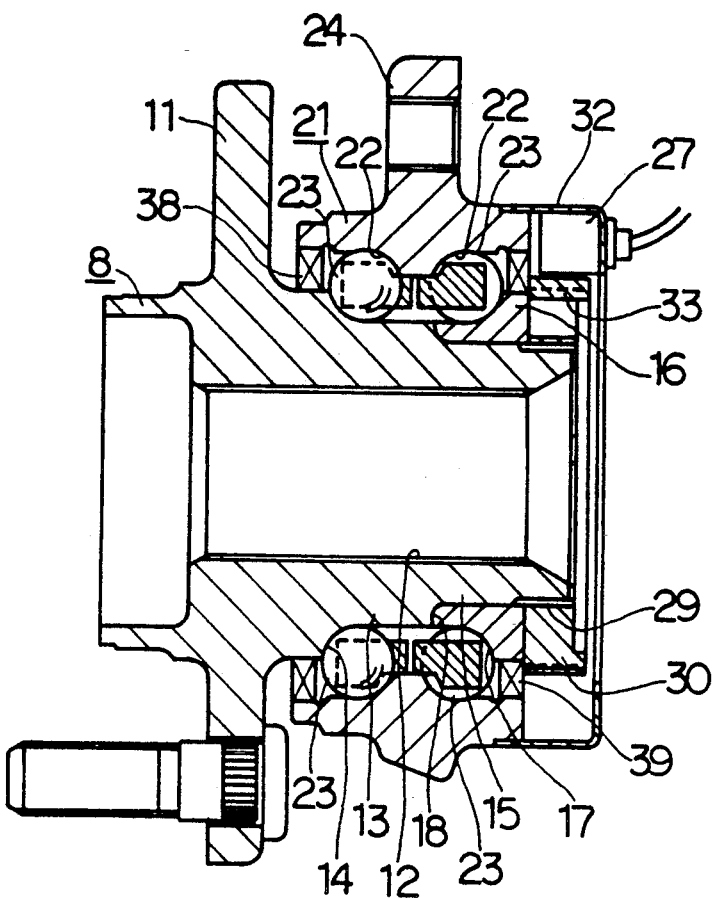
FIG. 2 is a cross sectional view of a second embodiment of the present invention.
Figure 3:
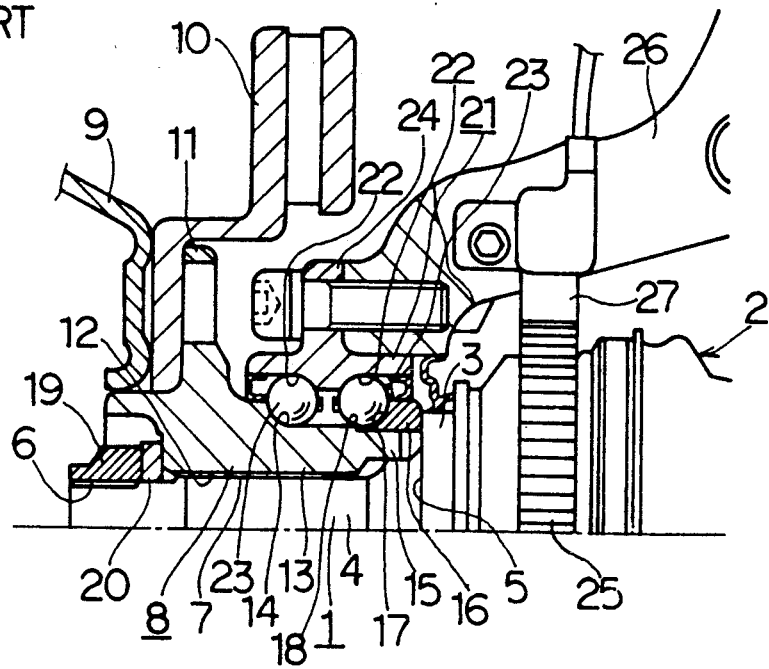
FIG. 3 is a cross sectional view of a half of a conventional hub unit.
Figure 4:
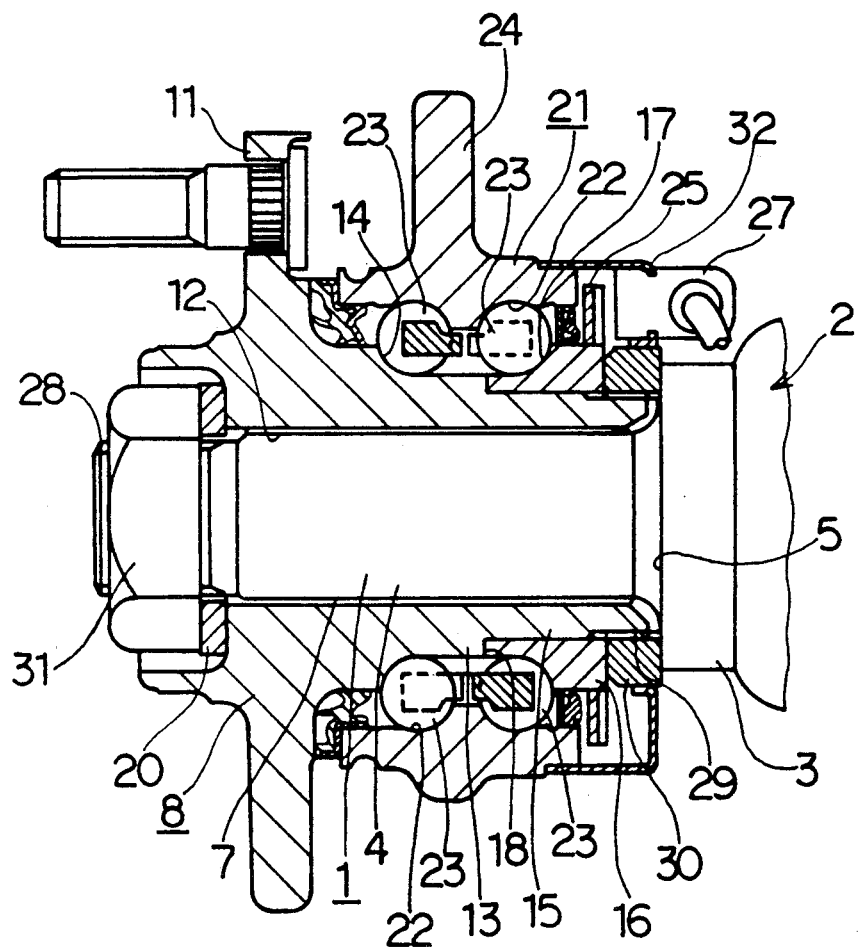
FIG. 4 is a cross sectional view of another conventional hub unit.

FIG. 2 shows a second embodiment of the present invention. In this embodiment, the sensor rotor 34 (FIG. 1) is omitted, and instead, a series of evenly spaced grooves-and-ridges are formed on the cylindrical outer peripheral face of the first nut 30. The speed sensor 27 is supported on the outer ring 21 by means of the dust cover 32 and positioned so as to face the outer peripheral surface of the first nut 30.

Other details of construction and operation are similar to the first embodiment and hence similar parts are indicated with the same numbers, and description is omitted for brevity. In each of the embodiments, any openings on the axially inner face of the first nut 30, such as recessed holes or slots-and-ridges may be formed instead of the through-holes 33.

In both of the above constructed speed sensing hub units of the present invention, the locking of the inner ring with respect to the hub and the bearing preload adjustment are achieved by tightening the first nut on the second male threaded portion as in the conventional hub unit. Furthermore the first nut is prevented from becoming loose by the tightly threaded engagement of the second nut on the first male threaded portion.

Consequently the problems with loosening of the first nut and sloppiness of the inner ring are practically eliminated.

In the case of the speed sensing hub unit of the present invention, since the sensor rotor of annular metal plate is clamped between the first nut and the inner ring, or alternatively, the first nut functions as the sensor rotor, it is not necessary to increase the length of the hub unit as before due to the presence of the sensor rotor.

The first nut can be tightened by engagement of a tool with the plurality of holes opening on the axially inner face of the first nut. Consequently the first nut can be tightened securely even though the circumference thereof is covered with the sensor rotor (in the first feature), or the outer peripheral surface of the first nut is formed as a cylindrical surface (in the second feature for providing slots-and-ridges thereon).

With the speed sensing hub unit of the present invention, due to the above mentioned construction, the assembly operation on the vehicle assembly line is simplified, and sloppiness of the inner ring with respect to the hub is positively prevented, so that a speed sensing hub unit of higher reliability and endurance is obtained.

Furthermore, since the length is not increased with the existance of the sensor rotor, the size and weight of the speed sensing hub unit can be reduced and optimized.

What is claimed:

1. A speed sensing hub unit for use with a constant velocity joint and a suspension unit for operating a wheel comprising:

a shaft axially extending from said constant velocity joint and having an axially inner first large diameter portion and an axially outer first small diameter portion and a first shoulder portion to connect said axially inner first large diameter portion and said axially outer first small diameter portion, said first small diameter portion having a first outer peripheral surface which has an axially outer end having a first threaded portion formed thereon, and a second outer peripheral surface which has a male spline formed thereon, a cylindrical hub having an outer peripheral surface on which a first flange is formed for supporting said wheel and a second large diameter portion is centrally located to form a first inner ring raceway directly thereon, an inner peripheral face on which a female spline is formed to engage with said male spline of said first small diameter portion, said outer peripheral surface having a second small diameter portion on which a second male threaded portion is formed and an axially inner end to which a second small diameter portion extends;

an inner ring fitted onto said outer peripheral surface of said second small diameter portion and having an axially inner end face and an outer peripheral surface on which a second inner ring raceway is formed;

a first nut having an axially outer end face and threaded onto said second male threaded portion of said hub to clampingly hold said inner ring between said first nut and said second shoulder formed between said second large diameter portion and said second small diameter portion, said first nut having an inner end face formed with an engaging means which protrudes out from said axially inner end of said hub;

a sensor rotor of a generally annular metal plate having a leg portion and an overhanging portion, said overhanging portion having outer and inner peripheral surfaces to generally surround said first nut, and said leg portion clampingly held between said axially outer end face of said first nut and said axially inner end face of said inner ring, an outer ring having an inner peripheral surface on which a pair of outer ring raceways is formed corresponding to said first and second inner ring raceways, and an outer peripheral surface on which a second flange for supporting is formed for attachment to said suspension unit;

a speed sensor supported on said outer ring so as to face to said outer peripheral surface of said sensor rotor; and a plurality of rolling bodies provided between said first and second inner ring raceways and said pair of outer ring raceways.

2. A speed sensing hub unit of claim 1, wherein said engaging means is comprised of axial holes.

3. A speed sensing hub unit of claim 1, wherein said engaging means is comprised of slots-and-ridges.

4. A speed sensing hub unit for use with a constant velocity joint and a suspension unit for operating a wheel comprising:

a shaft axially extending from said constant velocity joint and having an axially inner first large diameter portion and an axially outer first small diameter portion and a first shoulder portion to connect said axially inner first large diameter portion and said axially outer first small diameter portion, said first small diameter portion having a first outer peripheral surface which has an axially outer end having a first threaded portion formed thereon, and a second outer peripheral surface which has a male spline formed thereon, a cylindrical hub having an outer peripheral surface on which a first flange is formed for supporting said wheel and a second large diameter portion is centrally located to form a first inner ring raceway directly thereon, an inner peripheral face on which a female spline is formed to engage with said male spline of said first small diameter portion, said outer peripheral surface having a second small diameter portion on which a second male threaded portion is formed and an axially inner end to which said second small diameter portion extends;

an inner ring fitted onto said outer peripheral surface of said second small diameter portion and having an axially inner end face and an outer peripheral surface on which a second inner ring raceway is formed;

a first nut having an axially outer end face and threaded onto said second male threaded portion of said hub to clampingly hold said inner ring between said first nut and said second shoulder formed between said second large diameter portion and said second small diameter portion, said first nut having an inner end face formed with an engaging means which protrudes out from said axially inner end of said hub, and said first nut having a cylindrical outer peripheral surface with evenly spaced grooves-and-ridges formed therein;

an outer ring having an inner peripheral surface on which a pair of outer ring raceways is formed corresponding to said first and second inner ring raceways, and an outer peripheral surface on which a second flange for supporting is formed for attachment to said suspension unit, and a speed sensor supported on said outer ring so as to face to said outer peripheral surface of the first nut; and a plurality of rolling bodies provided between said first and second inner ring raceways and said pair of outer ring raceways.

5. A speed sensing hub unit of claim 4, wherein said engaging means is comprised of axial holes.

6. A speed sensing hub unit of claim 4, wherein said engaging means is comprised of slots-and-ridges.

* * * * *